(12) United States Patent
Maekipaeae et al.

(10) Patent No.: US 10,258,918 B2
(45) Date of Patent: Apr. 16, 2019

(54) APPARATUS TO PURIFY FRESH AIR USING BIODEGRADABLE FILTER

(71) Applicant: Lifa Air Environmental Technology Limited, Hong Kong (HK)

(72) Inventors: Vesa Tapani Maekipaeae, Hong Kong (HK); Cheong Tong Benjamin Shum, Hong Kong (HK)

(73) Assignee: Lifa Air Environmental Technology Limited, Hong Kong (HK)

( * ) Notice: Subject to any disclaimer, the term of this patent is extended or adjusted under 35 U.S.C. 154(b) by 0 days.

(21) Appl. No.: 15/245,183

(22) Filed: Aug. 24, 2016

(65) Prior Publication Data

US 2017/0072354 A1    Mar. 16, 2017

(30) Foreign Application Priority Data

Sep. 14, 2015  (HK) .................................. 15108978

(51) Int. Cl.
*B01D 46/00* (2006.01)
*B01D 53/04* (2006.01)
(Continued)

(52) U.S. Cl.
CPC ..... *B01D 53/0407* (2013.01); *B01D 46/0032* (2013.01); *B01D 46/0036* (2013.01);
(Continued)

(58) Field of Classification Search
CPC ........ B01D 46/24; B01D 46/32; B01D 46/36; B01D 53/407; B01D 2253/102; B01D 46/0032; B01D 46/0036; B01D 46/528; B01D 53/0407; B01D 53/32; B01D 2257/302; B01D 2257/404; B01D 2257/708; B01D 2258/06;
(Continued)

(56) References Cited

U.S. PATENT DOCUMENTS 6,156,089 A * 12/2000 Stemmer ............ B01D 46/0036
                                                          55/467
6,185,934 B1 * 2/2001 Teboul .................... B08B 15/00
                                                         55/385.3
(Continued)

FOREIGN PATENT DOCUMENTS

CN       2621047 Y     6/2004
CN     103446803 A    12/2013
(Continued)

*Primary Examiner* — Frank M Lawrence, Jr.
(74) *Attorney, Agent, or Firm* — Seppo Laine Oy

(57) ABSTRACT

An apparatus to purify fresh air contains at least three types of filters such as high efficient particle filter 5, chemical filter 6 and two stage electrostatic filters 2. The filters are secured to fresh air unit 1 that is secured to the wall 4 or window 11 of the building. Particularly, the present invention contains low noise fan 7 to reduce noises entering from outside. The particle filters and chemical filters are either in rolled form or in plate form with protrusions to have effective filtration. More particularly, the present invention relates to an apparatus for purifying freshly supplied air from outdoor environment and recirculates the indoor air by using new type easily installable and serviceable, filters that are environmentally friendly biodegradable filters.

15 Claims, 10 Drawing Sheets

(51) Int. Cl.
  *B03C 3/155*   (2006.01)
  *B03C 3/38*    (2006.01)
  *B01D 46/52*   (2006.01)
  *B03C 3/02*    (2006.01)
  *B03C 3/41*    (2006.01)
  *B03C 3/60*    (2006.01)
  *F24F 3/16*    (2006.01)
  *B01D 53/32*   (2006.01)

(52) U.S. Cl.
  CPC ........... *B01D 46/528* (2013.01); *B01D 53/32* (2013.01); *B03C 3/025* (2013.01); *B03C 3/155* (2013.01); *B03C 3/38* (2013.01); *B03C 3/41* (2013.01); *B03C 3/60* (2013.01); *F24F 3/16* (2013.01); *F24F 3/166* (2013.01); *B01D 2253/102* (2013.01); *B01D 2257/302* (2013.01); *B01D 2257/404* (2013.01); *B01D 2257/708* (2013.01); *B01D 2258/06* (2013.01); *B01D 2259/4508* (2013.01); *B01D 2273/30* (2013.01); *B01D 2275/105* (2013.01); *B03C 2201/10* (2013.01)

(58) Field of Classification Search
  CPC ........ B01D 2259/4508; B01D 2273/30; B01D 2275/105; F24F 3/16; F24F 3/166; B03C 3/025; B03C 3/155; B03C 3/38; B03C 3/41; B03C 3/60; B03C 2201/10
  USPC ......... 55/318, 360, 420, 486; 96/55, 95, 134
  See application file for complete search history.

(56) References Cited

U.S. PATENT DOCUMENTS

| | | | |
|---|---|---|---|
| 6,709,490 B1* | 3/2004 | Calderon De Los Santos | B01D 49/00 95/28 |
| 6,913,637 B2* | 7/2005 | Kim | B01D 46/0023 95/8 |
| 2006/0057020 A1* | 3/2006 | Tufo | A61L 9/20 422/24 |
| 2014/0223872 A1* | 8/2014 | Bao | B01D 39/16 55/486 |
| 2014/0238928 A1* | 8/2014 | Koch | B01D 39/2024 210/488 |
| 2014/0366734 A1* | 12/2014 | Moro Franco | A61L 9/16 96/55 |

FOREIGN PATENT DOCUMENTS

| | | |
|---|---|---|
| EP | 1247558 A1 | 10/2002 |
| JP | 2001510272 A | 7/2001 |
| JP | 2013052321 A | 3/2013 |
| KR | 20040075415 A | 8/2004 |
| KR | 20060016283 A | 2/2006 |
| KR | 20100044028 A | 4/2010 |
| KR | 20100075456 A | 7/2010 |

\* cited by examiner

APPARATUS TO PURIFY FRESH AIR USING BIODEGRADABLE FILTER

CROSS-REFERENCE TO RELATED APPLICATIONS

This application claims priority benefit of Hong Kong Patent Application No. 15108978.2 with a filing date of Sep. 14, 2015. The content of the aforementioned application, including any intervening amendments thereto, are incorporated herein by reference.

TECHNICAL FIELD

The present invention relates to an apparatus to purify fresh air using biodegradable filter. Specifically, the present invention relates to gas filtration apparatus. More specifically, the present invention relates to an apparatus for purifying freshly supplied air from outdoor environment and recirculates the indoor air by using new type easily installable and serviceable, filters that are environmentally friendly biodegradable filters.

BACKGROUND OF THE PRESENT INVENTION

Due to use of exhaust ventilation like kitchen hood or restroom's exhaust fan there is a normally negative pressure inside dwellings and other naturally ventilated facilities. If there is no mechanical fresh or supply air arrangement then, it indirectly means natural ventilation. Fresh air is arranged either by leakages in construction or by opening windows or by other openings to outdoors. This arrangement does not provide purification of fresh air, thus when outdoor is polluted simultaneously indoor pollutants level will increase, like PM2.5 levels. Temperature or humidity content of fresh air is hard to control and also the outdoor noises.

In naturally ventilated house the rooms are very airtight, carbon dioxide level can rise within few hours from few hundreds ppm to the level that is unhealthy or even harmful to humans. Thus opening of the window within several hours' frequency is needed or alternatively need to keep it open.

In some countries like China, especially in new buildings, there are several, ready to access holes (pipes through the walls) in construction phase for installing split type air conditioners. These pipes are usually located at non-reachable places like corners, thus known solutions are not suitable or existing fresh air system does not fit on available locations.

On the other hand making hole through wall is a normal practice, but size should be minimized, otherwise noise pollution from outside will increase unnecessarily. Big hole may also bring in too much hot or cold air this may cause high moisture and damage the walls, if open surfaces are not sealed properly. Alternatively temperature and humidity difference can cause dew point inside fresh air inlet causing together with organic dust potential risk for microbial growth. Fresh air from outdoor is needed mainly to dilute indoor pollutant levels.

Carbon dioxide level is often used as indicator for fresh air needs. The outdoor air in most locations contains about 300-400 ppm, carbon dioxide. Higher outdoor $CO_2$ concentrations can be found near vehicle traffic areas, industry, and sources of combustion. Indoor air quality standards—like in China GB/T 18883-2002 has limit value of 1000 ppm. When indoor carbon dioxide concentration is elevated, (compared to the outside air) the source would be the building's occupants. Human exhale carbon dioxide, the average adult's exhale contains about 35,000 to 50,000 ppm of $CO_2$ (100 times higher than outdoor air). $CO_2$ can accumulate if there is no adequate ventilation to dilute and remove the $CO_2$ i.e. continuously exhaled by the occupants. High $CO_2$ level can also indicate high concentration of other chemical pollutants like CO, $O_3$, Formaldehyde, B(a)P, TVOC, Polybrominated diphenyl ethers (PBDEs) or biological organisms like viruses, molds and bacteria's.

Carbon monoxide poisoning is the most common type of fatal air poisoning in many countries. Carbon monoxide is colorless, odorless, and tasteless, but highly toxic. In China, based on standard GB3095-2012, one hour average is 4 $mg/m^3$ and daily average is 10 $mg/m^3$. Within short time scales, carbon monoxide absorption is cumulative, since the half-life is about 5 hours in fresh air.

Polybrominated diphenyl ethers (PBDEs) causes delayed mental and physical development, lower IQ, advanced puberty and reduced fertility. Other flame retardants have been linked to cancer. They have been applied to textiles, foam in couches and baby products, building insulation, carpets, drapes, personal computers, TV sets, car dashboards, electrical cables and many other products. Because they are not chemically bound to material but incorporated during manufacturing or sprayed on afterward, they routinely escape as vapor or airborne particles that tend to stick to surfaces or settle in dust.

Formaldehyde's sources and pathways of exposure indoor sources may be combustion processes such as smoking, heating cooking, or candle or incense burning. However, major sources in non-smoking environments appear to be building materials and consumer products that emit formaldehyde. The average outdoor formaldehyde concentration in selected Chinese was 11.7 $\mu g/m^3$ for the period of 1997-2006 is disclosed in X. Tang el./ Environment International 35 (2009) 1210-1224. In China Indoor Air Quality Standards—GB/T 18883-2002 limit value for formaldehyde is 100 µg/m3.

"WHO Air Quality Guidelines" based on recent conclusive associations between daily mortality and lower ozone concentrations has recommended air quality limit in their 2005 Air Quality Guidelines for Ozone (O3) edition and the said limit is 100 $\mu g/m^3$ 8-hour mean. Excessive ozone in air can cause a marked effect on human health. It may lead to breathing problems, trigger asthma, reduce lung function and cause lung diseases. In Europe it is currently one of the air pollutants of most concern. Several European studies have reported that the daily mortality rises by 0.3% and that for heart diseases by 0.4%, per 10 $\mu g/m^3$ increase in ozone exposure.

The current WHO guideline value of 40 $\mu g/m^3$ (annual mean) was set to protect the public from the health effects of Nitrogen dioxide gas. As an air pollutant, $NO_2$ has several correlated activities, with short-term duration its concentrations exceeds 200 $\mu g/m^3$, it is a toxic gas which causes significant inflammation of the airways. $NO_2$ is the main source of nitrate aerosols, which form an important fraction of PM2.5 and, in the presence of ultraviolet light, of ozone. $NO_2$ is present in motor vehicle exhaust as well as in fumes from kerosene and other non-electric heaters, gas stoves and clothes dryers, fireplaces, and tobacco. It's also found in emissions from power plants and industrial boilers.

Sulfur dioxide ($SO_2$) has guideline values of 20 $\mu g/m^3$ 24-hour mean, 500 $\mu g/m^3$ 10-minute mean. A $SO_2$ concentration of 500 $\mu g/m^3$ should not be exceeded over average periods of 10 minutes duration. Studies indicate that a proportion of people with asthma experience changes in pulmonary function and respiratory symptoms after periods of exposure to $SO_2$ as short, as 10 minutes. $SO_2$ can affect the respiratory system and the functions of the lungs, and causes irritation of the eyes. Inflammation of the respiratory tract causes coughing, mucus secretion, aggravation of asthma and chronic bronchitis and makes people more prone to infections of the respiratory tract. Hospital admissions for cardiac disease and mortality increase on days with higher SO2 levels. Three studies measured outdoor levels in urban and rural areas of the same country as referred in Spengler at al., 1979; Lee at al., 1999; Kendzierski and Sembaluk, 2001. All found that more densely populated urban areas had higher outdoor $SO_2$ levels. Industrial, home heating and vehicular traffic emissions are potential sources related to population density.

Volatile organic compounds—VOCs are a well-known outdoor air pollutant. They are categorized as either methane ($CH_4$) or non-methane (NMVOCs). Methane is an extremely efficient greenhouse gas which contributes to enhance global warming. Other hydrocarbon VOCs are also significant greenhouse gases because of their role in creating ozone and prolonging the life of methane in the atmosphere. This effect varies depending on local air quality. The aromatic NMVOCs benzene, toluene and xylene are suspected carcinogens and may lead to leukemia with prolonged exposure.

Particulate matter (PM) affects more people than any other pollutant. The major components of PM are sulfate, nitrates, ammonia, sodium chloride, black carbon, mineral dust and water. It consists of a complex mixture of solid and liquid particles of organic and inorganic substances suspended in the air. The most health-damaging particles are those with a diameter of 10 microns or less, (≤PM10), which can penetrate and lodge deep inside the lungs. Chronic exposure to particles contributes to the risk of developing cardiovascular and respiratory diseases, as well as of lung cancer.

Air quality measurements are typically reported in terms of daily or annual mean concentrations of PM10 particles per cubic meter of air volume ($m^3$). Routine air quality measurements typically describe such PM concentrations in terms of micrograms per cubic meter (μg/m3). When sufficiently sensitive measurement tools are available, concentrations of fine particles (PM2.5 or smaller), are also reported.

There is a close, quantitative relationship between exposure to high concentrations of small particulates (PM10 and PM2.5) and increased mortality or morbidity, both daily and over time. Conversely, when concentrations of small and fine particulates are reduced simultaneously mortality will also go down—presuming other factors remain the same. This allows policymakers to project the population health improvements that could be expected if particulate air pollution is reduced.

Small particulate pollution have health impacts even at very low concentrations—indeed no threshold has been identified below which no damage to health is observed. Therefore, the WHO 2005 guideline limits aimed to achieve the lowest concentrations of PM possible.

Noise pollution is recognized as a major problem for the quality of life in urban areas all over the world. Because of the increase in the number of cars and industrialization, noise pollution has also increased. Noise in cities, especially in main areas, has reached up disturbing levels. The complex urban soundscape is shaped by a combination of environmental noise from transit systems, road traffic, construction, industry, the built environment, population density and other sources.

The noise pollution is not a unique problem for developing countries only. Many researchers have revealed that, more than 130 million people in Europe suffer from exposure to noise levels above 65 dB (A). Bond M (1996) Plague by noise, New Scientist 16: 14-15, reports that 16% of people in Europe are expose to 40 dB(A) or more of traffic noise in their bed rooms at night compare it with WHO's average estimates of 30 to 35 dB(A) for undisrupted sleep. World Health Organization has announced that during nighttime outdoor sound level should not exceed 45 dB(A).

In addition to criteria affecting the degree of air cleanliness, factors such as cost (initial investment and maintenance), space requirements, and airflow resistance have led to the development of a wide variety of air cleaners. The three distinguishing operating characteristics are efficiency, resistance to airflow, and dust-holding capacity.

Minimum efficiency during the life of the filter is the most meaningful characteristic for most filters and applications. Resistance to airflow (or simply resistance) is the static pressure drop differential across the filter at a given face velocity. The term static pressure differential is interchangeable with pressure drop and resistance if the difference of height in the filtering system is negligible.

Dust-holding capacity defines the amount f a particular type of dust that an air cleaner can hold when it operates at a specified airflow rate to some maximum resistance value.

Complete evaluation of air cleaners therefore requires data on efficiency, resistance, dust-holding capacity, and the effect of dust loading on efficiency and resistance.

High-efficiency particulate air (HEPA) filter must remove at least 99.97% of all particles greater than 0.3 micrometer from the air that passes through it. EPA/HEPA/ULPA filter classification is based on values for local particle collection efficiencies (local values) and integral efficiency (integral value). Each is assessed on the basis of the most penetrating particle size (MPPS). Because of the features of the filter the pressure drop is high the usage for fresh air filtration is very limited.

Coarse, Medium and Fine filters are disposable air filters designed to operate through a specific performance rate and then discarded and replaced. Filtration efficiency of Coarse, Medium and Fine filters improves when dust loading increase. Simultaneously pressure drop also increase and filtration efficiency is the highest just before changing the filter. These types of filters are not efficient for small size of particles (like 0.4 micron) and usage for filtering re-circulated indoor air is limited.

Water and mist filtration has three serious disadvantages against other filters and those are: 1. control of the humidity and moisture nearby filter unit, 2. risks for bacterial growth (like *legionella*) as water is not changed periodically and 3. consumption of the water if water is used continuously.

Ozone generators are not suitable to be used as fresh air purposes: instead ozone is one of the main pollutants that need to be filter off from fresh air and re-circulated indoor air.

Photocatalytic oxidations (PCO) is inefficient for filtering fresh air from outdoor, for purifying re-circulated air it has some effects but there are also found as disadvantage that it may create formaldehyde and acetaldehyde, both hazardous for humans.

Ultraviolet germicidal irradiation (UVGI) technology is good for destroying DNA structures of microbes but it need enough time for radiate enough energy dosage. Therefore using it for sterilizing microbes from free flowing air is inefficient. UVGI technology is suitable for killing living organism inside filter unit that are either trap to filter media or inner surfaces of the casing.

Chemical filters are needed for removing gaseous contaminants from the air. Often used activated carbon is not efficient for filtering high vapor pressure gases, like formaldehyde. Depending on gaseous contaminant and dosages, chemical filters need certain composition and adsorption time, which is correlating with air speed through material. Even this requirement needed thickness of activated carbon granulates having high pressure drop when using traditional method of manufacture.

Most of the air purifiers on the market are having chemical filter with activated carbon granulates. They have installed granulates inside honeycomb type metal or plastic structure and covered it both side with stretchy net made from either metal or plastic. Disadvantage of this type of solution is that when lifting filter on upright position granulates will push flexible net and carbon bed become uneven—actually there will be holes on structures without any filter media. Airflows will go through those holes without filtration, thus there is no air flow resistance.

Electronic Air Cleaners:

Some air cleaners, such as externally powered electrostatic precipitators (also known as electronic air cleaners) have very often in the beginning high filtration efficiency. After charger unit there is collection section, which is normally steel plates or net.

Wire Corona Chargers:

Wire corona chargers are difficult to clean and on use they create ozone, even when they are clean.

Various air filters for supplying purified fresh air has been devised in a some of the measures are as follows:

CN2906423 relates to a natural fresh air into the home device outlet mainly used to connect to the wind in the outdoor side wall interior ventilation tube, three directions can be blown into the room. Disadvantage of this solution is that when temperatures and pressures in indoor and outdoor air are same or difference is only minimal then air from outdoor won't penetrate to indoor and carbon dioxide level will stay high.

CN203949307 relates to an air purifier, especially relates to a filter to clean indoor and outdoor air and aromatherapy function of air purification system. It further relates to a unit comprising pre-filter, PCO-filter, HEPA-filter, fan, activated carbon filter, formaldehyde filter, and ionizer inside smaller intake pipe that is located inside fresh air pipe. Disadvantage in this solution is that filter like HEPA and activated carbon filter causes high pressure drop and small size fan, like in this application can hardly overcome that.

Known prior arts CN203068671, CN10387928, CN293478450, CN2348284, CN203349399, CN203132030, CN201283117 and CN203704238 relates to filter, heat, cool and dehumidify or humidify fresh air from outdoor. Disadvantage of these solutions and air arrangement is that they need relatively big space and effective fans thus energy consumption and sound level are high. These solutions are converted as miniature models from Air Handling Units, old technology that has already been adapted and used globally, in HVAC industry, having only minor changes for last decades.

CN203421792 is intended to provide a type household air purification devices, it can effectively reduce interior noise in the room at the same time add fresh outdoor air, but this type of arrangements is that based on temperature difference, its hard to control amount of fresh air.

CN201277666 relates to a kind of air conditioning units, in particular, it relates to an outdoor fresh air into the indoor air conditioner, more particularly it relates to sleeve that is used for enabling connection of fresh air intake pipe and indoor located air purifier.

CN202442444 discloses that fresh air intake pipe and indoor located air purifier is connected with climb and climbing buckle.

Self-locking hung air purifier disclosed in CN4844749(Y) describes about the use of air intake pipe for permanent hanging solution.

Another known prior arts CN203443015(U), CN203980487U, CN103398441A, CN203642412(U), CN201069227, CN103644613, CN202590559, CN201253368, CN2199470(Y) discloses air purifier with rear shell excluding pipe connection that connects fresh air inlet.

Further known Prior arts CN103353153A, CN203097659 (U), KR 100797894(81), CN2367950(Y) discloses the fresh air purifying unit that is mounted to windows.

CN203928174 relates to an air purification device, in particular a fresh air purifier that is design to suck fresh air from outdoor through small hole by using small air hose.

Yet another known prior arts CN103623665(A), CN103623665(A), CN203657089(U) discloses a fresh air purifying unit that is connected with hose to fresh air intake pipe and the said units are either firmly mounted to walls or removable unit on floors, like.

Another known prior arts CN203731589U, CN102563767B, CN201253367Y discloses mix fresh air with indoor air inside air purifier or air handling unit by using either manual or electrical driven mechanical valves or dampers.

Further known prior arts US201310213414A1, WO2010131031 (A2) relates to low pressure one way air valve in a flapper disc type.

Another known prior art of passive electrostatic air filters EP1596960(B1), KR20110008369(A), KR101317615(B1) relates to electrostatic charges, that may be either natural or imposed upon the media during manufacturing. For enabling air through tightly formed filter media structures, plurality of protrusions is formed on an electrified film. The disadvantages of these inventions are that such filters may demonstrate high efficiency while considering their use (with low air velocity) and drop rapidly in efficiency during their actual life cycle. One of the main reasons is that ultrafine and fine particles will cover charged fibers or charged film that finally switch of its magnetic field. Due these solutions weak electric field, filtration efficiency of fine particles will decrease significantly, when air velocity inside filter media increases. To avoid this dramatic drop of filtration efficiency, protrusions are irregularly formed on an electrified film with very narrow cap between filter film layers. This leads uneven distribution of dust inside filter media and only the front surface of the filter will be loaded with dust that logs filter.

Yet another U.S. Pat. No. 5,993,521A relates to two-stage electrostatic filter where steel plates are replaced with non-metallic materials. When loading with dust, removal efficiency will decrease (plate-type) and/or pressure drop (Pa) will increase (net-type). Efficiency of these devices may decline over time, and their service life is dependent on the conductivity and the dust collected.

The present invention overcomes the inadequacies of the prior art by providing air filters that is easily installable and serviceable, that has environmentally friendly biodegradable disposable filters.

SUMMARY OF PRESENT INVENTION

One or more of the problems of the conventional prior art may be overcome by various embodiments of the present invention.

Accordingly, the primary object of the present invention is to provide an apparatus to purify fresh air using biodegradable filter.

It is one object of the present invention, wherein the apparatus particle filter that is either rolled or on plate form and its media is either conductive, medium conductive, non-conductive or combination of these.

It is another object of the present invention, wherein the said apparatus consists of two-stage electrostatic filters by having corona discharge from brush type carbon fibers that are installed inside grounded frames and collection section media.

It is yet another object of the present invention, wherein the said apparatus has open installation surface that is used based on the size and shape of air inlet.

It is yet another object of the present invention, wherein it efficiently filters ozone from fresh and re-circulated air with its low pressure drop and high efficiency chemical filter.

According to the basic aspect of the present invention there is provided an apparatus to purify fresh air using biodegradable filter comprises:
Fresh air unit;
Wherein the said fresh air unit comprises of:
Housing unit
High efficient particle filter;
Chemical filter;
plurality of protrusions;
Particle filter media;
two-stage electrostatic filters;
Brush type carbon fibers;
Grounded frames;
Fresh air inlet;
Low pressure one way rubber valve; and
Low noise fan.

It is one aspect of the present invention, wherein the said particle filter media is either conductive, medium conductive, non-conductive or combination of all.

It is another aspect of the present invention, wherein the said filter has plurality of protrusions formed on filter film.

It is another aspect of the present invention, wherein the said particle filter is either in rolled form or in plate form.

It is another aspect of the present invention, wherein the said chemical filter is selected from the mixture of several compounds such as activated carbon, impregnated activated carbon, zeolite, sodium bicarbonate etc. having sizes of granulates, that are suitable for gluing without blocking significantly adsorption area.

It is another aspect of the present invention, wherein the said two-stage electrostatic filters comprises of corona discharge from brush type carbon fibers that are installed inside grounded frames and collection section media.

It is another aspect of the present invention, wherein the said collection section media is either conductive, medium conductive, non-conductive or combination of all.

It is another aspect of he present invention, wherein the said low pressure one way rubber air valve is twisted on sides against the said housing, whereas the said air valve opens inside fresh air unit to maintain pressure inside the unit.

It is another aspect of the present invention, wherein the said rubber is selected from impermeable material but not limited to halogenated butyl rubber or EDPM rubber.

It is another aspect of the present invention, wherein the said particle, filters and chemical filters are made of environmentally friendly biodegradable materials.

These and other aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

Figure 1:
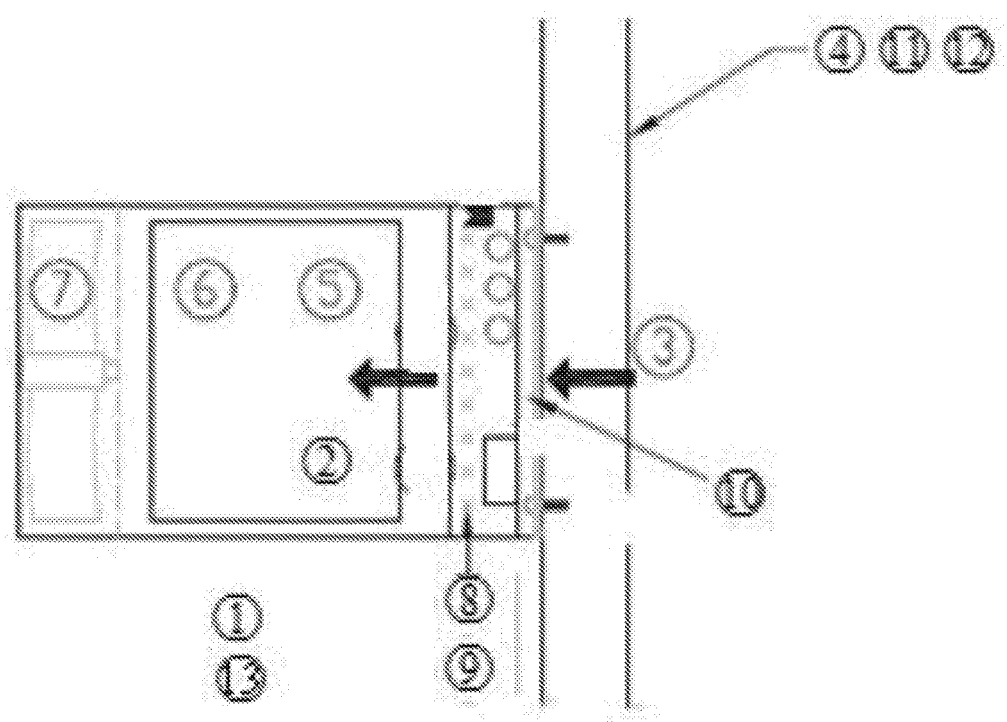
FIG. 1 illustrates the perspective view of fresh air unit affixed to wall or window, according to the present invention.

The figures constitute a part of this specification and include illustrative embodiments of the present invention and illustrate various objects and features thereof. Further, the figures are not necessarily to scale, some features may be exaggerated to show details of particular components. In addition, any specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION OF PREFERRED EMBODIMENTS

The present invention will be apparent from the following detailed description, which proceeds with reference to the accompanying drawing, wherein the same references relate to the same elements.

In general, the subject matter of the present invention is directed to an apparatus to purify fresh air. Specifically, the apparatus contains fresh air unit with biodegradable filters secured to it. Particularly, the present invention contains three types of filters such as two stage electrostatic filters, high efficiency particle filter 5 and chemical filters 6. The said filters are either in rolled form or in plate form. The said filter has plurality of protrusions with equal size and space between them. The present invention has open installation surface secured to air inlet valve 14 of wall 4 or window 11. The said fresh air unit 1 contains low pressure one way rubber valve 14 secured to housing. More particularly, the present invention contains fans 7 with low noise that enable the usage of the invention even at night times, when carbon dioxide levels are highest in bedrooms.

With reference to FIG. 1, the present invention contains fresh air unit 1 of various shapes but not limited to cube, cuboid, square pyramid, cone, triangular prism, triangular pyramid, cylinder and sphere or there combinations. The said fresh air unit 1 intakes the air, especially the fresh air for purification from outdoor, having air volume normally between 5-20 l/s (18-72 m3/h) per person that is depending on usage of facilities and national standards and it can be mixed with re-circulated air with an adjustable re-circulation rate.

Figure 2:
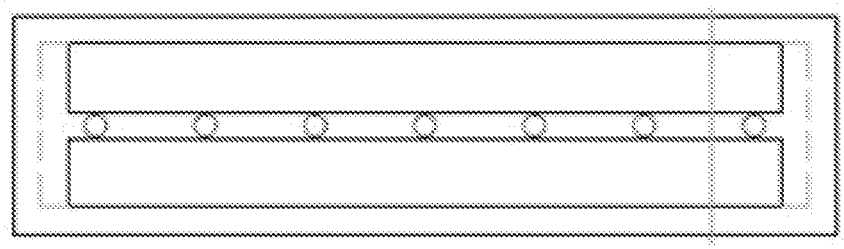
FIG. 2 illustrates the sectional view of one way air valve n the housing of the fresh air unit, according to the present invention.
Figure 3:
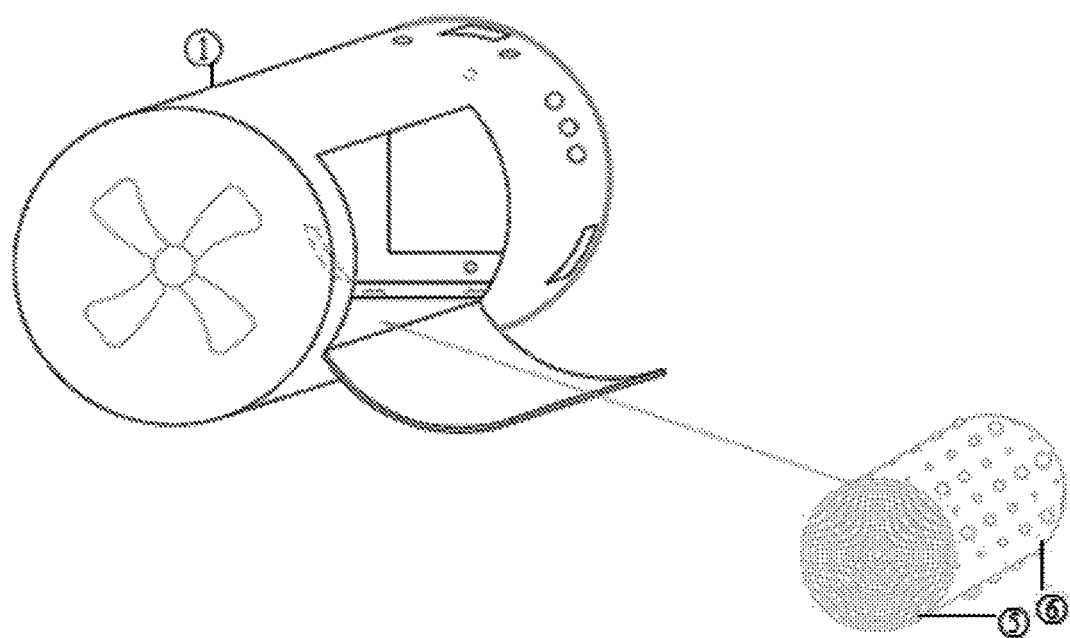
FIG. 3 illustrates the perspective view fresh air unit affixed to the wall or window with the rolled high efficient particle filter, according to the present invention.
Figure 4:
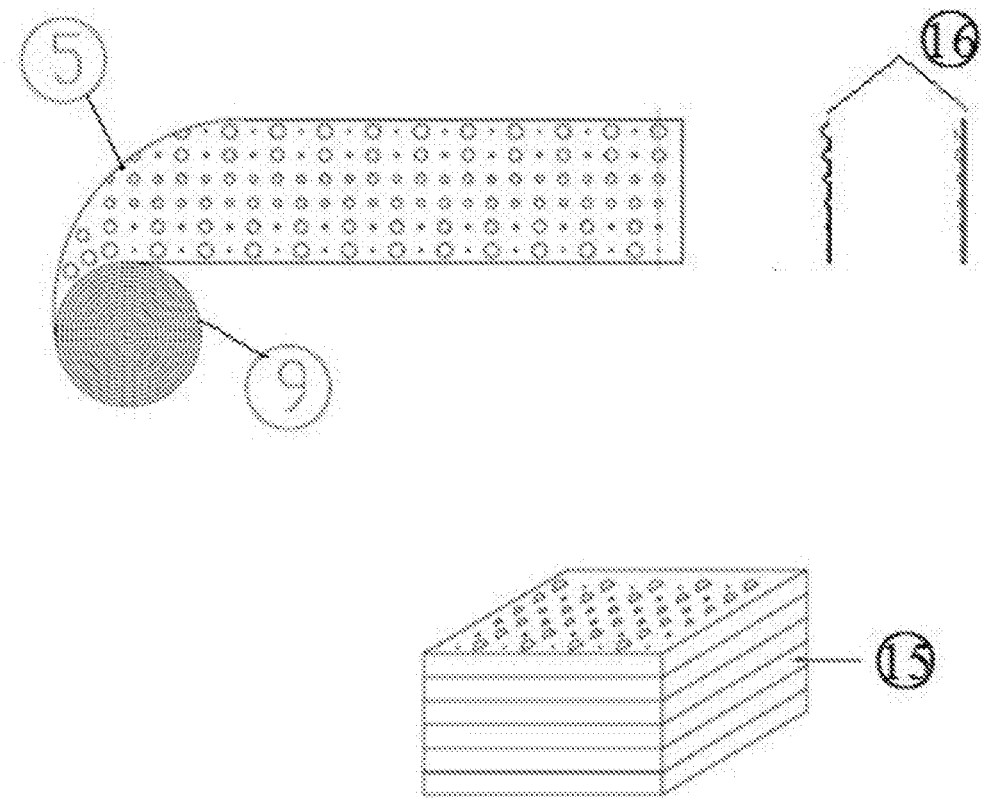
FIG. 4 illustrates the side view of high efficient particle filter in rolled form and in plate form with the protrusions formed on the filter film, according to the present invention.
Figure 5:
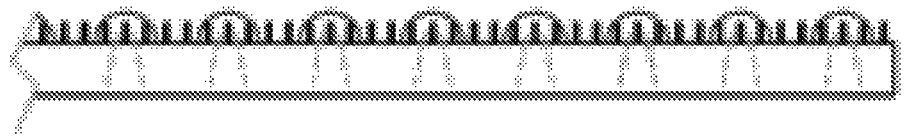
FIG. 5 illustrates the sectional view of the high efficiency particle filter in plate form according to the present invention.
Figure 6:
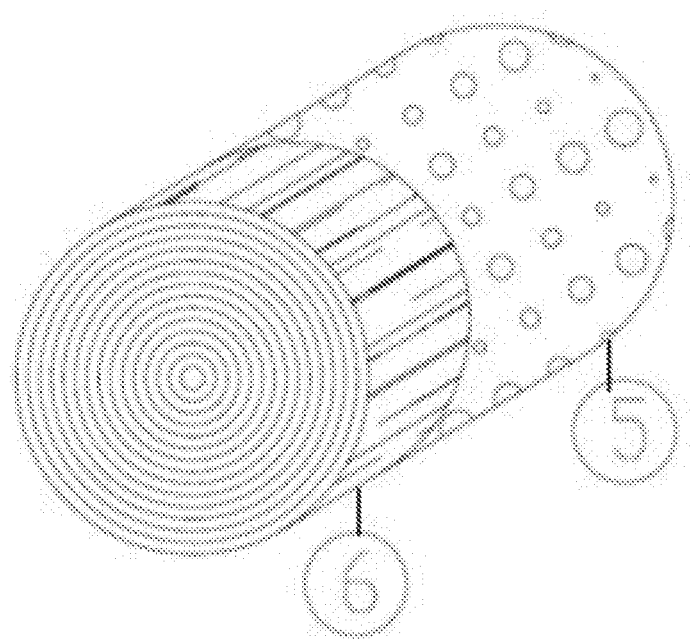
FIG. 6 illustrates the diagonal view of arrangement of high efficiency particle filter with chemical filter, according to the present invention.
Figure 7:
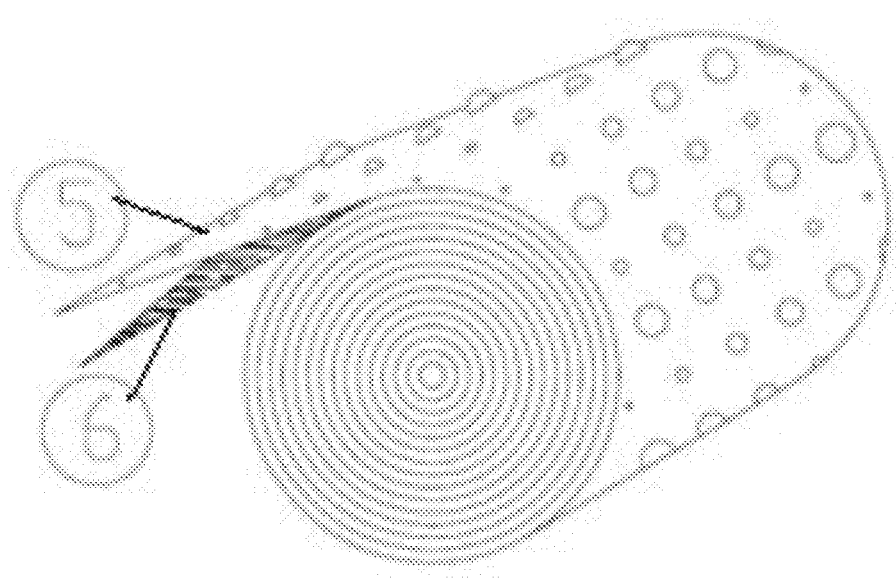
FIG. 7 illustrates the side view of high efficiency particle filter with chemical filter film secured at its bottom, according, to the present invention.
Figure 8:
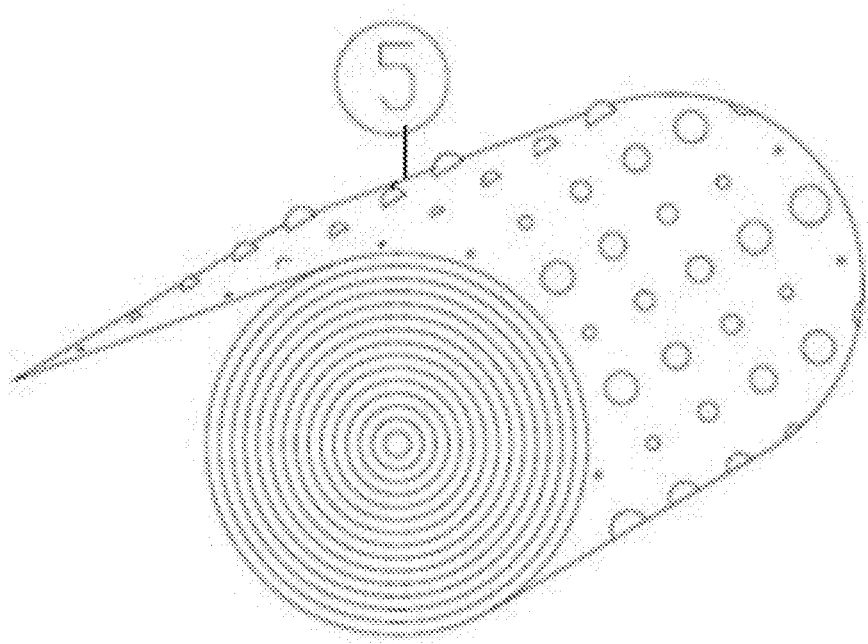
FIG. 8 illustrates the rolled mode of high efficiency particle filter, according to the present invention.
Figure 9:
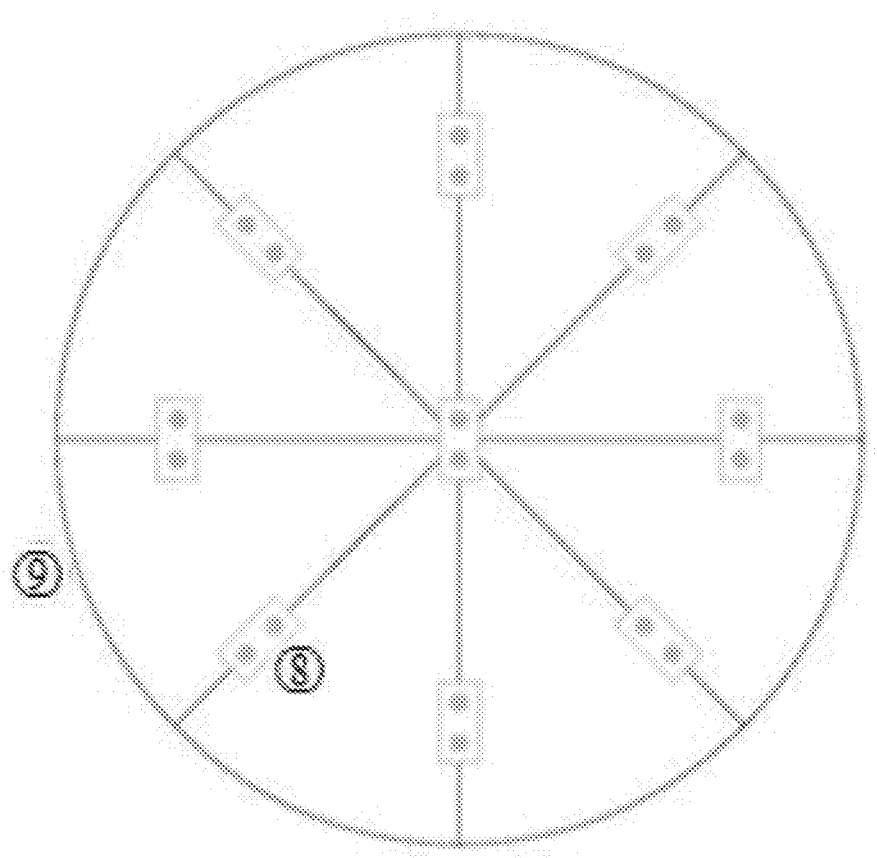
FIG. 9 illustrates the sectional view of arrangement of brush type carbon fibers and grounded frames in circular plate, according to the present invention.
Figure 10:
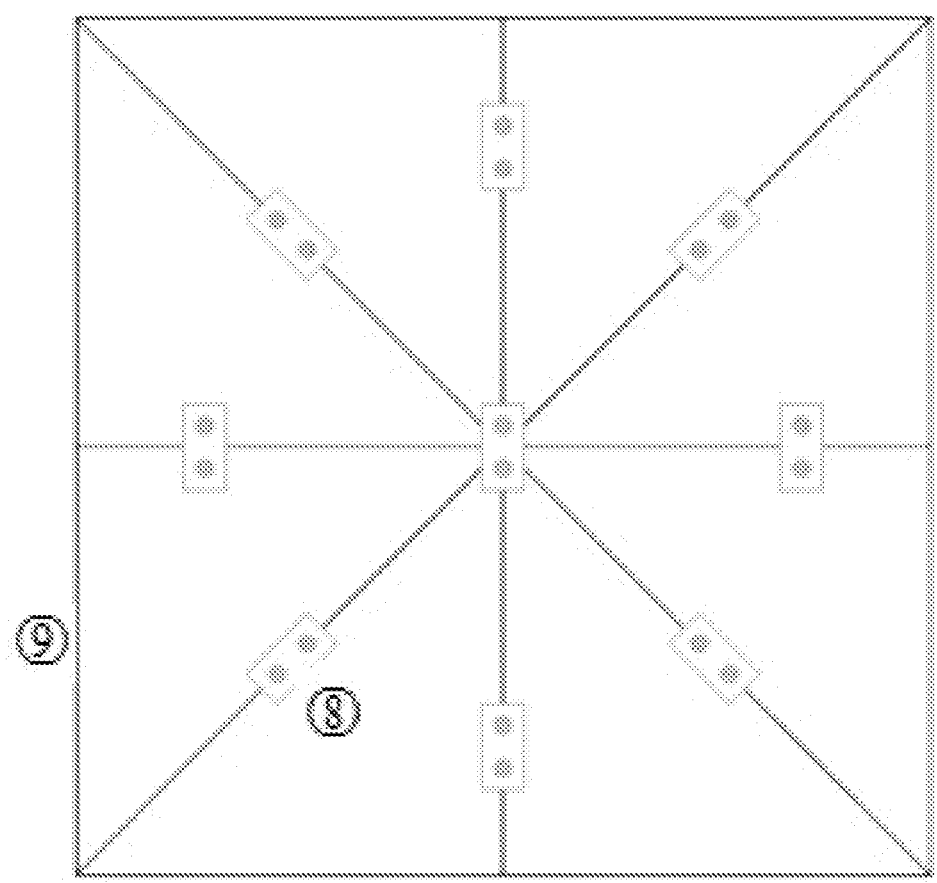
FIG. 10 illustrates the sectional view of arrangement of brush type carbon fibers and grounded frames in square plate, according to the present invention.

In one embodiment of the present invention, wherein the said apparatus as referred in FIG. 2 contains housing unit secured to fresh air unit 1. The said housing consists of low pressure one way rubber air valve arrangement that is designed for automatic re-circulating of air rate without any manually or electrically driven valves or dampers. Air flow direction in fresh air unit 1 is from outside to inside. The rubber of one way air valve 14 is twisted on sides against housing, thus one way air escape valve 14 open inside fresh air unit 1 as soon as the pressure inside the unit exceeds adjusted pressure. The said rubber is made from impermeable material but not limited to halogenated butyl rubber and EDPM rubber.

In another embodiment of the present invention, wherein the said unit has maintenance free charger that is executed by brush type carbon fibers 8, installed permanently to unit's air intake for giving uniformly corona discharge to the intake air, both for fresh and re-circulated ones.

In yet another embodiment, the present invention contains fans 7 and based on fans rotation speed, air volumes and pressure difference, one way air valve's 14 rubber sensitiveness (flexibility and thickness) is designed to adjust automatically with targeted fresh and re-circulated air rates.

In one preferred design of the present invention, as referred in FIGS. 3 to 10, the said fresh air unit 1 contains three types of filters such as two way electrostatic filter 2, high efficiency particle filter 5 and chemical filter. Based on the gaseous form of pollutants that are required to be filtered, the said filters are selected from mixture of several compounds such as activated carbon, impregnated activated carbon, zeolite, sodium bicarbonate etc. having size of granulates, that are suitable for gluing without blocking significantly adsorption area.

In another preferred design of the present invention, wherein the said fresh air unit 1 comprises of high efficiency particle filter 5 and chemical filter, for purifying particle and gaseous contaminants. The said particle filter sheet and chemical filter sheet are fixed together in adjacent position. These filters are either in rolled or in plate form 15. Particle filter media is either conductive, medium conductive, non-conductive or combination of these. The said filters have plurality of protrusions 16 formed on filter film systematically with equal sizes and distance between them to have intended gap between filter film layers. This leads even distribution of dust particle inside filter media and whole surface of the filter have high loading capacity.

Based on the need of the width of carbon bed, granulates are mixed with required amount to form glue and the process is based on heating (time and temperature). After heating with certain temperature and time, activated carbon granulates transform to required form with low pressure, hence enabling the use in required form, size and position inside air purifier.

In one embodiment of the present invention, the filter used is at least two-stage electrostatic filter 2 with corona discharge from brush type carbon fibers 8 that are secured to grounded frames 9 and collection section media which is either conductive, medium conductive, non-conductive or combination of these. The present invention uses 5-10 kV corona discharger when using in normal household fresh air arrangement and 7-50 kV corona discharger when using in mechanical ventilated buildings air handling units. Charged air that flows through the filter is at least 1 kV charged before reaching collection section. This provides high electric field on collection filter film, even it is fully covered by ultrafine and fine particles. This also provides high filtration efficiency even air velocity inside filter media increases.

In another embodiment of the present invention, the said open installation surface is secure to air inlet 10, fixed in wall 4 or window 11 and its frames 12 or other surfaces and their structures, but limited to display housing size of the invention. The said open installation surface is designed to fit the thickness of the wall 4 or other structures without any extra arrangement for installation.

The present invention uses existing pipe(s) of the building for securing to wall 4 or window 11 while bringing fresh air from outdoor to indoor. It provides continuously flow of fresh air from outdoor, thus protecting people against carbon monoxide poisoning. It also uses existing liquid pipes that are installed for spilt air conditioning unit. These pipes can be used even they are partly filled with other components like insulated pipes/hoses. This provides the easy installation of the invention without making any new holes to the buildings. The present invention is design to act as active noise insulation unit 13 preventing outdoor noises to access through it to indoor.

Advantages:

Fresh air and recirculated air filtration is efficient solution to dilute formaldehyde level present inside the building.

The said filters efficiently filters ozone from fresh and re-circulated air with its low pressure drop and high efficiency chemical filter.

The present invention has efficient particle and chemical filter to prevent $NO_2$ from entering inside through fresh air inlet and filter it through re-circulated air.

The present invention has efficient chemical filter to prevent $SO_2$ from entering inside through fresh air inlet, thus it purifies $SO_2$ from re-circulated air.

The said invention efficiently filters VOC's from fresh and re-circulated air with its low pressure drop and high efficiency chemical filter.

The said invention efficiently filters particulate matters from fresh and re-circulated air with its low pressure drop and high efficient environment friendly biodegradable disposable filters.

The present invention is designed to reduce noise from outside by providing small openings.

The said invention can be used in naturally and mechanically ventilated buildings.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

We claim:

1. An apparatus to purify fresh air using a biodegradable filter comprising:
    at least one housing unit;
    at least one high efficiency particle filter;
    at least one chemical filter;
    a plurality of protrusions on a plurality of filter film layers;
    particle filter media;
    at least one Two-stage electrostatic filter comprising
        at least one brush type carbon fibers and
        at least one grounded frame;
    at least one fresh air inlet;
    at least one low pressure one way rubber valve; and
    at least one low noise fan.

2. The apparatus according to claim 1, wherein the said particle filter is in rolled form.

3. The apparatus according to claim 1, wherein the said particle filter media is either conductive or medium conductive.

4. The apparatus according to claim 1, wherein the said chemical filter is selected from the group consisting of activated carbon, impregnated activated carbon, zeolite and sodium bicarbonate, and having sizes of granulates, that are suitable for gluing without blocking significantly adsorption area.

5. The apparatus according to claim 1, wherein the at least one two-stage electrostatic filter comprises corona discharge from brush type carbon fibers that are installed inside grounded frames, and collection section media.

6. The apparatus according to claim 5, wherein the said collection section media is either conductive, medium conductive, non-conductive or combination of these.

7. The apparatus according to claim 1, wherein the said low pressure one way rubber air valve is twisted on sides against the said housing, whereas the said air valve opens inside fresh air unit to maintain pressure inside the unit.

8. The apparatus according to claim 1, wherein the said rubber is selected from impermeable material but not limited to halogenated butyl rubber or EDPM rubber.

9. The apparatus according to claim 1, wherein the said low noise fan is selected based on rotation speed, air volumes and pressure difference.

10. The apparatus according to claim 1, wherein the said particle filters and chemical filters are made of environmentally friendly biodegradable materials.

11. The apparatus according to claim 1, wherein the chemical filter and the high efficiency particle filter are fixed together in an adjacent position.

12. The apparatus according to claim 1, wherein the said particle filter is in plate form.

13. The apparatus according to claim 1, wherein the said protrusions are equally sized.

14. The apparatus according to claim 1, wherein the said protrusions have an equal distance to one another.

15. The apparatus according to claim 1, wherein the chemical filter is adapted to filter ozone.

* * * * *